(12) United States Patent
Priest

(10) Patent No.: US 6,807,039 B2
(45) Date of Patent: Oct. 19, 2004

(54) INRUSH LIMITER CIRCUIT

(75) Inventor: Joel F. Priest, Raleigh, NC (US)

(73) Assignee: ADC DSL Systems, Inc., Eden Prairie, MN (US)

(*) Notice: Subject to any disclaimer, the term of this patent is extended or adjusted under 35 U.S.C. 154(b) by 17 days.

(21) Appl. No.: 10/191,338

(22) Filed: Jul. 8, 2002

(65) Prior Publication Data
US 2004/0004798 A1 Jan. 8, 2004

(51) Int. Cl.[7] .............................................. H02H 3/08
(52) U.S. Cl. ..................................................... 361/93.1
(58) Field of Search ............................. 361/93.1, 91.1, 361/58, 9, 57; 323/908; 327/434, 328

(56) References Cited

U.S. PATENT DOCUMENTS

| | | |
|---|---|---|
| 3,935,527 A | 1/1976 | Michelet et al. |
| 3,968,421 A | 7/1976 | Marcade |
| 3,993,935 A | 11/1976 | Phillips et al. |
| 4,079,440 A | 3/1978 | Ohnuma et al. |
| 4,245,270 A | 1/1981 | Busby |
| 4,647,848 A | 3/1987 | Barrett |
| 4,656,320 A | 4/1987 | Maddock |
| 4,658,320 A | 4/1987 | Hongel |
| 4,678,984 A | 7/1987 | Henze |
| 4,814,687 A | 3/1989 | Walker |
| 4,891,728 A | 1/1990 | Preis et al. |
| 4,908,489 A | 3/1990 | Panecki et al. |
| 5,010,293 A | 4/1991 | Ellersick |
| 5,077,675 A | 12/1991 | Tam |
| 5,079,455 A | 1/1992 | McCafferty et al. |
| 5,122,724 A | 6/1992 | Criss |
| 5,155,648 A * | 10/1992 | Gauthier .................... 361/58 |
| 5,187,653 A | 2/1993 | Lorenz |
| 5,283,707 A | 2/1994 | Conners et al. |
| 5,374,887 A | 12/1994 | Drobnik |
| 5,519,264 A | 5/1996 | Heyden et al. |
| 5,559,660 A | 9/1996 | Watson et al. |
| 5,563,545 A | 10/1996 | Scheinberg |
| 5,587,685 A | 12/1996 | Johansson |
| 5,619,127 A | 4/1997 | Warizaya |
| 5,714,809 A | 2/1998 | Clemo |
| 5,737,165 A | 4/1998 | Becker |
| 5,774,315 A | 6/1998 | Mussenden |
| 5,784,244 A | 7/1998 | Moran et al. |
| 5,834,924 A | 11/1998 | Konopka et al. |
| 5,898,844 A | 4/1999 | Thompson |
| 5,903,182 A | 5/1999 | Jordan |
| 5,932,943 A | 8/1999 | Werner et al. |
| 5,951,660 A | 9/1999 | Van Wonterghem |
| 5,990,723 A | 11/1999 | Tanase |
| 6,028,755 A | 2/2000 | Saeki et al. |
| 6,046,896 A | 4/2000 | Saeki et al. |
| 6,054,899 A | 4/2000 | Ke |
| 6,105,091 A | 8/2000 | Long |
| 6,188,305 B1 | 2/2001 | Chang et al. |
| 6,204,648 B1 | 3/2001 | Saeki et al. |
| 6,225,797 B1 | 5/2001 | Willis et al. |
| 6,308,233 B1 | 10/2001 | Park |
| 6,335,654 B1 * | 1/2002 | Cole ........................... 327/546 |
| 6,525,515 B1 * | 2/2003 | Ngo et al. ................... 323/277 |
| 6,538,866 B1 * | 3/2003 | Hanzawa et al. ........... 361/91.1 |
| 6,624,994 B1 * | 9/2003 | Schmoock et al. ......... 361/93.1 |
| 6,703,889 B2 * | 3/2004 | Dodson, III ................ 327/434 |

* cited by examiner

Primary Examiner—Brian Sircus
Assistant Examiner—James Demakis
(74) Attorney, Agent, or Firm—Fogg & Associates, LLC; David N. Fogg

(57) ABSTRACT

A junction field effect transistor (JFET), acting as a switch, is coupled between the source and gate of a metal oxide semiconductor field effect transistor (MOSFET). A capacitor is connected in parallel with the MOSFET's "Miller capacitance" by being coupled between the gate and drain of the MOSFET in series with a current limiting resistor. When the JFET is on, it has a low impedance with zero gate voltage and forces the gate to source voltage of the MOSFET to remain near zero and, thus, the MOSFET in a high impedance state, until the capacitor charges to the supply voltage.

31 Claims, 5 Drawing Sheets

INRUSH LIMITER CIRCUIT

TECHNICAL FIELD

The present invention relates generally to the powering of circuit cards and particularly to limiting inrush current to a circuit card.

BACKGROUND

Some systems require that the time the system is turned off while swapping circuit cards should be minimized. This can be accomplished by the removal and insertion of the circuit cards while power is still applied to the system. This is typically referred to in the art as "hot swapping" or "hot plugging".

Hot swapping can create a number of problems. For example, as an inserted circuit card is powered by mating the two connectors, the input voltage applied to the circuit card steps to the voltage of the mating power source. Since the circuit card typically has input filter circuits that include capacitors, the step-up in input voltage causes a large current to flow as a result of the input capacitors charging. This is typically referred to in the art as the inrush current. The inrush current may exceed the current rating of not only the power source but any fuses and circuit breakers as well. Also, a high inrush current may cause the connector pins to erode more quickly than normal.

Another problem with hot swapping is that the physical mating of two connectors can potentially cause contact chatter. Contact chatter is the physical bouncing of the contacts that occurs as the contacts on one connector come into contact with the contacts on a mating connector. The contact chatter causes voltage and current pulses to occur as the contacts make and break the electrical connection. These pulses could harm the circuitry of the circuit card.

Many different approaches exist to limit inrush current and contact chatter. These approaches are typically designed to limit the current to some predetermined magnitude that the circuitry can handle.

An active inrush limiter circuit is typically complex in that it uses transistors, operational amplifiers, comparators, and/or logic devices to generate time delays in controlling the application of power to a connected circuit card. Another conventional limiter circuit comprises a simpler approach by using a capacitor and resistor circuit connected to a bipolar junction transistor (BJT) or metal oxide semiconductor field effect transistor (MOSFET).

These approaches, however, introduce problems of their own. For example, the active inrush limiters require that the inrush limiter circuitry have a sufficient voltage to control the active components (e.g., transistors, operational amplifiers, comparators). A BJT circuit requires that the voltages exceed the base-to-emitter turn-on voltage of approximately 0.6V, plus bias overhead voltages. A MOSFET requires that the voltages exceed the gate-to-source turn-on voltage (threshold voltage) of approximately 2–4 Volts, plus bias overhead voltages. Other active components require that the input voltages exceed the minimum operating voltage for the device. This voltage can typically be in the range of 1.5V to 5V.

A common problem with the above approaches is that total inrush current control is not possible unless the control voltages of the circuits are maintained or reach a correct level to properly bias the transistors of the circuit. If the transistors typically used have no initial power applied, they are in the off state and cannot control the inrush current or the contact chatter. There is a resulting need in the art for limiting inrush current and contact chatter in a hot swappable electronic circuit.

SUMMARY OF THE INVENTION

Embodiments of the present invention encompass an inrush limiter circuit. The circuit comprises a first field effect transistor having a source terminal, a gate terminal, and a drain terminal. The source terminal is coupled to an input power source and the drain terminal is coupled to an output of the inrush limiter circuit.

A capacitor is coupled between the drain terminal and the gate terminal of the field effect transistor. A switching device is coupled between the gate and source terminals of the field effect transistor. When the switching device is turned on, it applies a voltage to the capacitor in order to charge the capacitor to the input power source level.

DETAILED DESCRIPTION

Embodiments of the present invention provide an active control circuit that combines the benefits of a gate to source capacitor with the benefits of a gate to drain capacitor in order to limit inrush current. Contact chatter is also eliminated.

Figure 1:
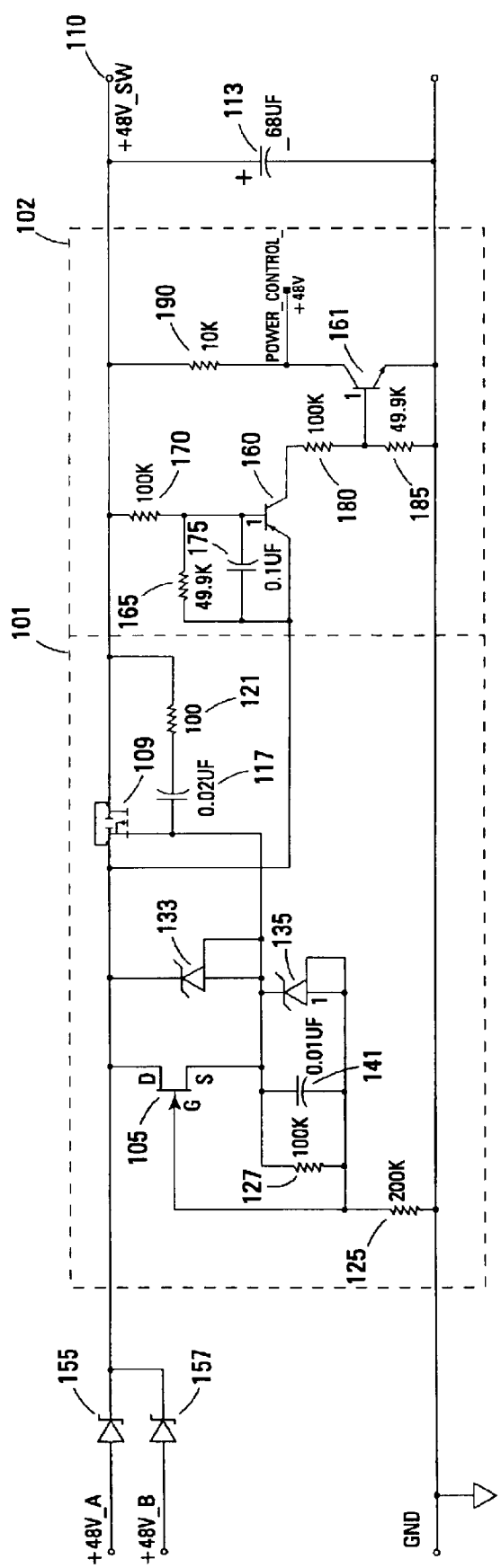
FIG. 1 shows a schematic diagram of one embodiment of the inrush limiter circuit of the present invention.

FIG. 1 illustrates a schematic diagram of one embodiment of the inrush limiter circuit. This embodiment uses an inrush limiter circuit (101) for a positive supply voltage. In one embodiment, the positive supply voltage is +48V. Alternate embodiments may use a negative supply voltage, both positive and negative supply voltages, and/or different supply voltage levels.

One of the transistors (105) of the embodiment of FIG. 1 is a junction field effect transistor (JFET) (105). The source of this transistor (105) is connected to the gate of a MOSFET (109). The drain of the JFET (105) is connected to the source of the MOSFET (109). Other embodiments use other types of transistors (105 and 109) however they may require some form of bias voltage to function properly.

In this embodiment, the JFET (105) is used as a switching device. Therefore, it is desirable that the JFET (105) have a low drain to source resistance ($R_{dson}$). A typical range for drain to source resistance in one embodiment is 2.5–150 Ohms.

The current to charge the output load capacitance (113) is controlled by the capacitor (117) that is in parallel with the MOSFET's (109) "Miller capacitance". This additional "Miller capacitor" (117) is connected to the gate of the MOSFET (109) in series with a current limiting resistor (121). Gate biasing resistors (125 and 127) that are connected in series form a biasing circuit to control the biasing voltage to the MOSFET's (109) gate.

The JFET (105) permits the MOSFET (109) to begin the turn-on cycle. Since the JFET has a low impedance when it is "on" with zero gate voltage, the condition at initial application of power, the JFET forces the gate to source voltage (Vgs) of the MOSFET (109) to approximately zero volts. This holds the MOSFET in a high impedance state (i.e., "off"). Therefore, no current flows into the load capacitance (113). The active components of the present invention are used in such a way that their intrinsic "no power" state is the initial state desired. In other words, the JFET (105) is "on" and the MOSFET (109) is "off" before power is applied.

The JFET (105) is biased using two resistors (125 and 127) in series. Two zener diodes (133 and 135) limit the voltages seen at the gates of the MOSFET (109) and JFET (105) to safe levels. A safe voltage level is different for different transistors and different applications. A particular safe level may be determined by that particular transistor's manufacturer data sheet.

When a circuit that includes the inrush limiter circuit is connected to an input power source, the "Miller capacitor" (117) charges to the supply voltage level through the JFET (105), the load capacitance (113), and any load resistance. A current limiting resistor (121) limits the current to the "Miller capacitor" (117).

The JFET (105) begins to turn off as its gate is biased through the biasing resistors (125 and 127). A capacitor (141) delays the turn-off of the JFET (105) by slowing the increase in the gate voltage to the gate threshold voltage as a function of a time constant that is set up by the parallel resistance of the series biasing resistors (125 and 127) and the capacitor (141). Once the capacitor (141) is charged to the gate threshold voltage, the JFET turns off (i.e., switches to a high impedance state). Increasing the value of the capacitor (141) or one biasing resistor (125), or both the capacitor (141) and the resistor (125), increases the turn-off delay.

The increase of the gate voltage of the JFET (105) above the JFET (105) gate threshold voltage causes the impedance of the gate to source of the MOSFET (109) to increase rapidly. This allows the MOSFET (109) gate voltage to rise as the intrinsic gate to source capacitance is charged through the MOSFET (109) biasing resistors (125 and 127).

Once the JFET (105) is off, the gate to source voltage ($V_{gs}$) of the MOSFET (109) charges as a function of the bias resistors (125 and 127) until Vgs is substantially equal to the $V_{gs}$ threshold voltage of the MOSFET (109). In one embodiment, $V_{gs}$ is $-3V$. This threshold voltage, however, is different for different MOSFETs and can be determined by that particular transistor's manufacturer data sheet.

The MOSFET (109) begins to conduct drain current at the Vgs threshold voltage. The MOSFET's (109) drain current conduction causes the drain to move toward the input power supply voltage as the MOSFET (109) turns on. When the MOSFET (109) turns on, the current in the bias resistors (125 and 127) limits the current available to charge the "Miller capacitor" (117).

The MOSFET's (109) gate to source capacitance remains approximately constant as the drain voltage moves toward the input voltage level. This is a result of the negative feedback path of the "Miller capacitor" (117) that causes the current in the MOSFET's (109) "Miller capacitance" and the "Miller capacitor" (117) to substantially equal the current available from the bias resistors (125 and 127). If the input voltage remains constant, the voltage of the bias resistors also remains constant since the MOSFET (109) $V_{gs}$ remains constant.

The voltage differential across the series combination of the biasing resistors (125 and 127) determines current to the MOSFET's (109) gate. In the embodiment where the input voltage is +48V, ignoring the small input diode (155 and 157) voltage drop, the voltage differential across the biasing resistors (125 and 127) is 45V (+48V −3V).

This is true unless the voltage across a biasing resistor (127) is substantially equal to the zener diode (135) clamp voltage. In this case, the current available to charge the "Miller capacitor" (117) is determined by the voltage across the other bias resistor (125). Again assuming the +48V input supply voltage example, this voltage is determined by 48V- $V_{gs}$- $V_{cr2}$, where $V_{cr2}$ is the zener diode (135) voltage.

In both cases, the current to the MOSFET (109) is substantially constant until the "Miller capacitor" (117) is fully discharged. This occurs when the MOSFET (109) is on. The constant current charging of the "Miller capacitor" (117) on the MOSFET's (109) drain voltage has the effect of slowly ramping the output voltage across the load capacitance (113) from zero volts to the supply voltage. The inrush current is, therefore, eliminated and filter ringing is reduced or eliminated.

While the load capacitance (113) of the embodiment of FIG. 1 is described as 68 μF, the inrush limiter circuit of the above embodiment can be tailored for different values of load capacitance. Since capacitor current can be defined as I=C*(dv/dt), where I is the capacitor current, C is the value of the capacitor, and dv/dt is the rate of change of the capacitor voltage as a function of time. It can be seen that if dv/dt is constant then the current is constant and a function of the value of C. Therefore, if the capacitance is increased by a factor of n, where n is constant, the capacitor current also increases by a factor of n. If dv/dt is also reduced by a factor of 1/n, the current remains the same.

In the embodiment of FIG. 1, two zener diodes (155 and 157) are connected to the input supply voltage. These diodes (155 and 157) reduce the occurrence of any negative voltage spikes or input power reversal from damaging components. They also allow the use of redundant power sources.

One embodiment of the present invention includes a power control circuit (102) that provides another level of inrush current control with a power control signal. An embodiment where such a power control circuit (102) can be used would be to enable power regulators in a load circuit to turn on after the completion of the initial inrush control. This prevents the power regulators from turning on until after the input filter circuitry is fully charged and the currents associated with the turn on have returned to the low steady state values expected. This aids in the total inrush control function as additional loads are not applied until the input filter is fully charged. For the embodiment illustrated in FIG. 1, it is assumed that the loads have their own soft start capability.

Referring to FIG. 1, a transistor (160) turns on after the application of input power by sensing the voltage across the MOSFET (109). It remains on until the source to drain voltage drops to less than a predetermined voltage (e.g., 1.5 Volts). The transistor (160) turns off when the MOSFET (109) is fully on.

A capacitor (175) is part of a time delay circuit that adds a time delay to allow the MOSFET (109) to reach its maximum saturation level (minimum $R_{dson}$). The power control circuit (102) illustrated in FIG. 1 shows a 0.1 μF capacitor (175). In alternate embodiments, the capacitance value may be increased to increase the time delay or decreased to decrease the time delay.

A second transistor (161) is used to control the low voltage regulators in the load circuit. The specific load application determines whether the load's power supply regulator uses the output of only the first transistor (160) and/or the second transistor (161) as the control element.

If the first transistor (109) controls the power supply regulator, the start-up currents of the power supply regulator occur after the initial charging of a capacitor on the power bus (110). If it is designed with proper inrush or start-up slowdown circuitry, the total system inrush currents may be controlled.

Two resistors (165 and 170) are used to properly bias the first transistor (160). The second transistor (161) is also biased by resistors (180 and 185) in addition to a collector current limiting resistor (190) connected between the power supply and the transistor's collector.

The above-described power control circuit (102) is illustrated in each of the figures discussed subsequently. However, the inrush limiter circuit embodiments of the present invention are not limited to using the power control circuit (102).

Figure 2:
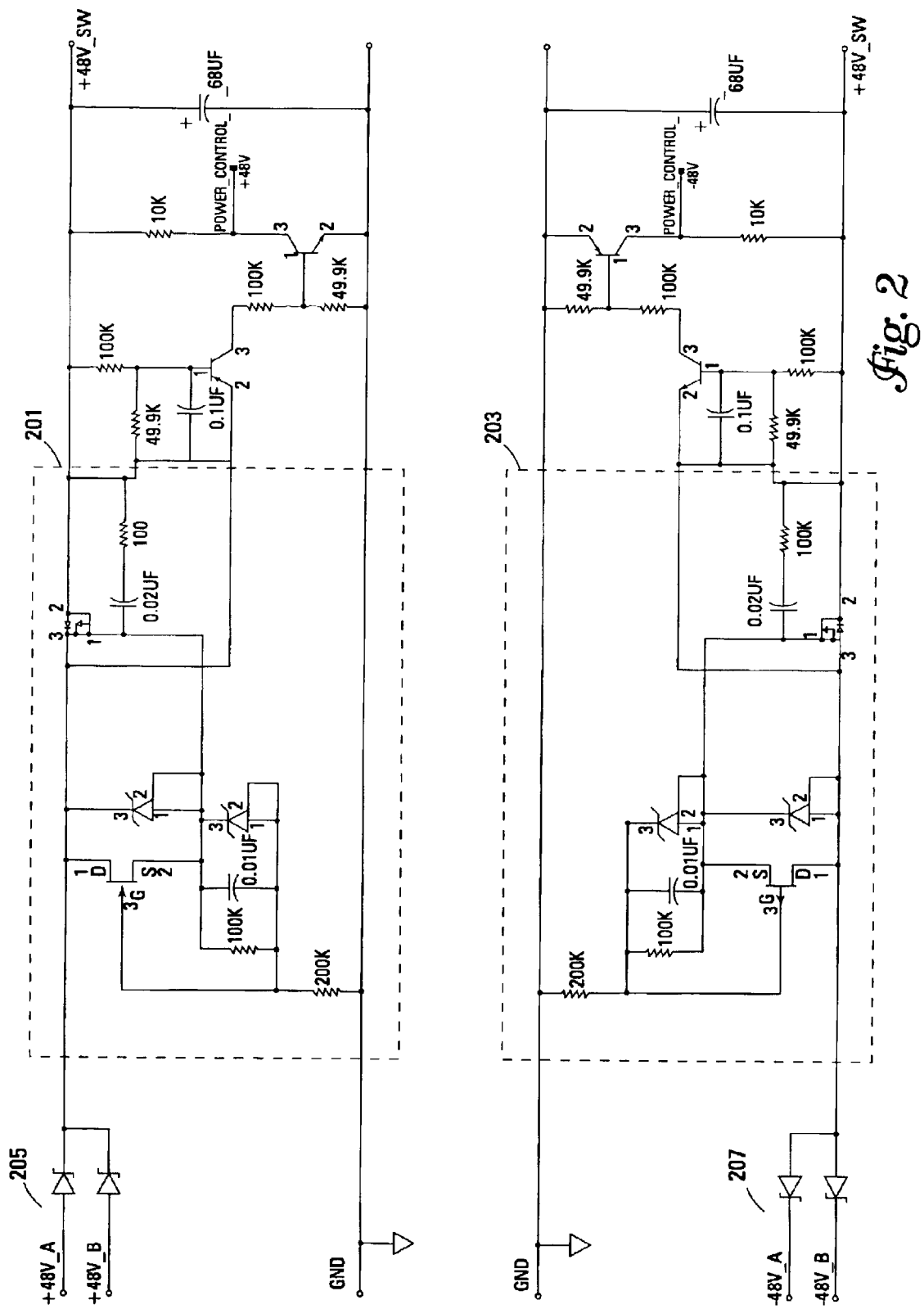
FIG. 2 shows a schematic diagram of another embodiment of the inrush limiter circuit of the present invention.

FIG. 2 illustrates a schematic diagram of another embodiment of the inrush limiter circuit. This embodiment uses an inrush limiter circuit (201) for a positive supply voltage (205) and an inrush limiter circuit (203) for a negative supply voltage (207). In one embodiment, the positive supply voltage (205) is +48V and the negative supply voltage (207) is −48V. Alternate embodiments use different voltage levels and different quantities of voltage levels.

The embodiment of FIG. 2 is similar to the embodiment of FIG. 1 except the mirror image inrush limiter circuit (203) is included for the negative supply voltage (207). Since the magnitude of the supply voltage is the same as the embodiment of FIG. 1, the component values are the same in the inrush limiter circuit (203) for the negative supply voltage (207) as for the inrush limiter circuit (201) for the positive supply voltage (205). As in the embodiment of FIG. 1, these component values are for illustration purposes only and do not limit the scope of embodiments of the present invention.

Figure 3:
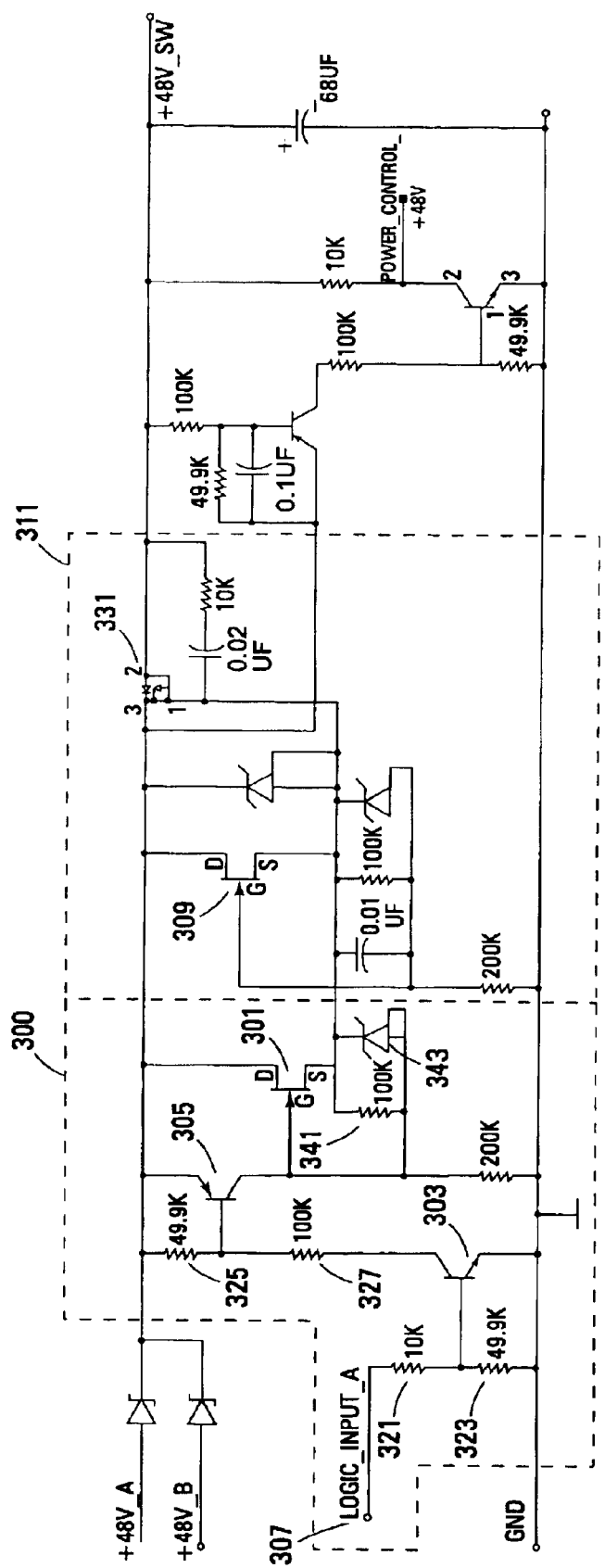
FIG. 3 shows a schematic diagram of yet another embodiment of the inrush limiter circuit of the present invention.

FIG. 3 illustrates yet another embodiment of an inrush limiter circuit. This embodiment incorporates a logic control circuit (300) that works with an inrush limiter circuit (311), similar to the inrush limiter circuit described in the embodiment of FIG. 1, in order to eliminate contact chatter problems.

In the embodiment of FIG. 3, the logic control circuit (300) includes a JFET (301) and two bipolar junction transistors (BJTs) (303 and 305) to enable external control (307) of the inrush limiter circuit (311) in order to turn on and off the output of the inrush limiter circuit (311).

The external control (307) may be coupled to an external control device that includes an open collector BJT transistor, an open drain FET, or a logic device having an output that can be put into a high impedance state. The external control device generates a logic high turn-on voltage activation signal, such as+5V, in order to activate the control circuit (300).

The turn-on voltage biases one of the BJTs (303) through its biasing resistors (321 and 323). When this BJT (303) turns on, the second BJT (305) is biased through its biasing resistors (325 and 327). This BJT (305) is part of a voltage level shifting circuit that shifts the control voltage level at the gate of the control circuit's JFET (301) to the supply voltage.

The JFET (301) of the control circuit (300) is connected in parallel with the JFET (309) of the inrush limiter circuit (311). This connection resets the MOSFET (331). The JFET's (301) gate to source circuits includes a resistor (341) and zener diode (343). A capacitor is not used in this embodiment in order to reduce the time to react to removal of input power either by intentional unplugging of the circuit card or by contact chatter as the card is plugged in. It is also effective when the voltage is applied with a switch or relay, both of which may have contact chatter.

The control circuit (300) JFET (301) provides a quick turn-on of the inrush limiter circuit's (311) MOSFET (331). The control circuit also ensures that the MOSFET (331) is off when the supply power is applied and allows the inrush limiter circuit (311) to operate as if the control circuit (300) was not present.

Figure 4:
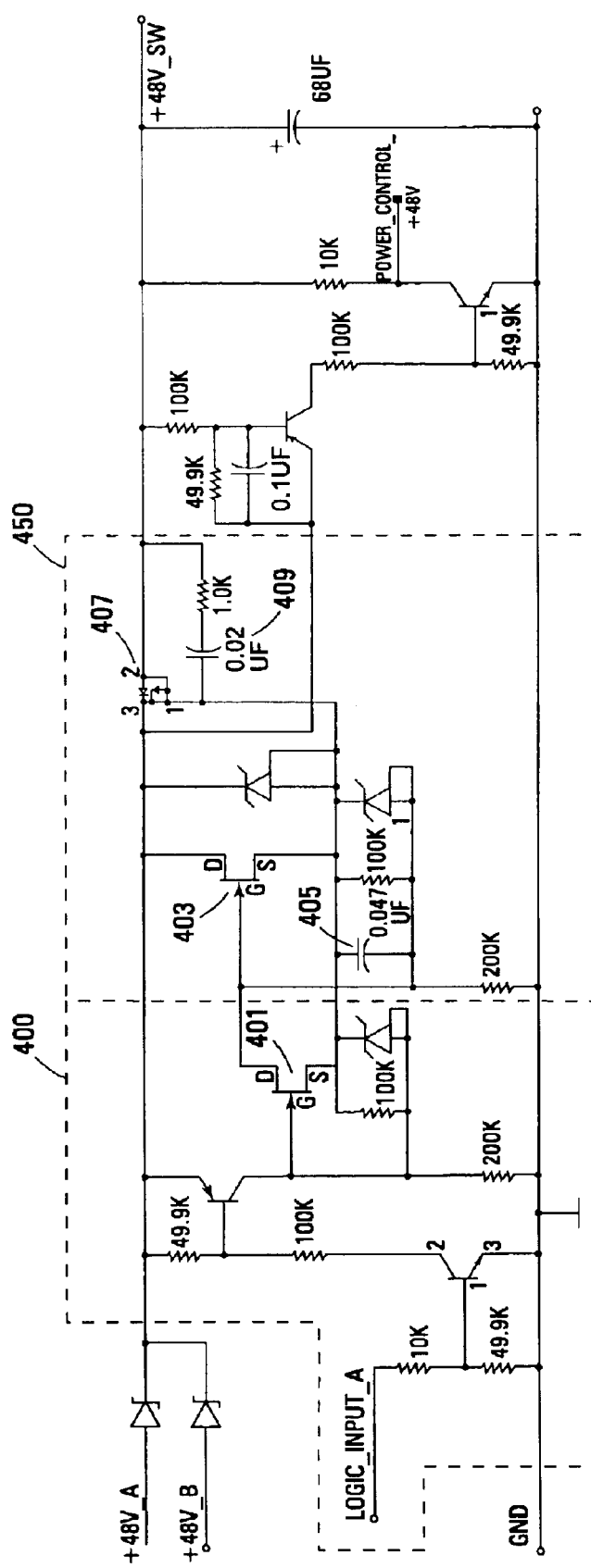
FIG. 4 shows a schematic diagram of still another embodiment of the inrush limiter circuit of the present invention.

FIG. 4 illustrates yet another inrush limiter circuit embodiment. This inrush limiting embodiment connects the drain of the control circuit's (400) JFET (401) to the gate of the JFET (403) in the inrush limiter circuit (450). The sources of the two transistors (401 and 403) are also connected. In the event of contact chatter, the transistor (401) discharges a capacitor (405), which turns on the inrush limiter JFET (403). This transistor (403) turning on then turns off the MOSFET (407) thus charging the "Miller capacitor" (409) to the supply voltage.

The inrush embodiments of the present invention may be employed in circuits that have multiple supply voltages, as is illustrated in the embodiment of FIG. 2. There is no limit to the number of supply voltages or the voltage levels that can be controlled by the inrush limiter circuit.

The component values of the various embodiments of the present invention are for illustration purposes only. Alternate embodiments use other component values and still remain within the scope of the present invention.

Figure 5:
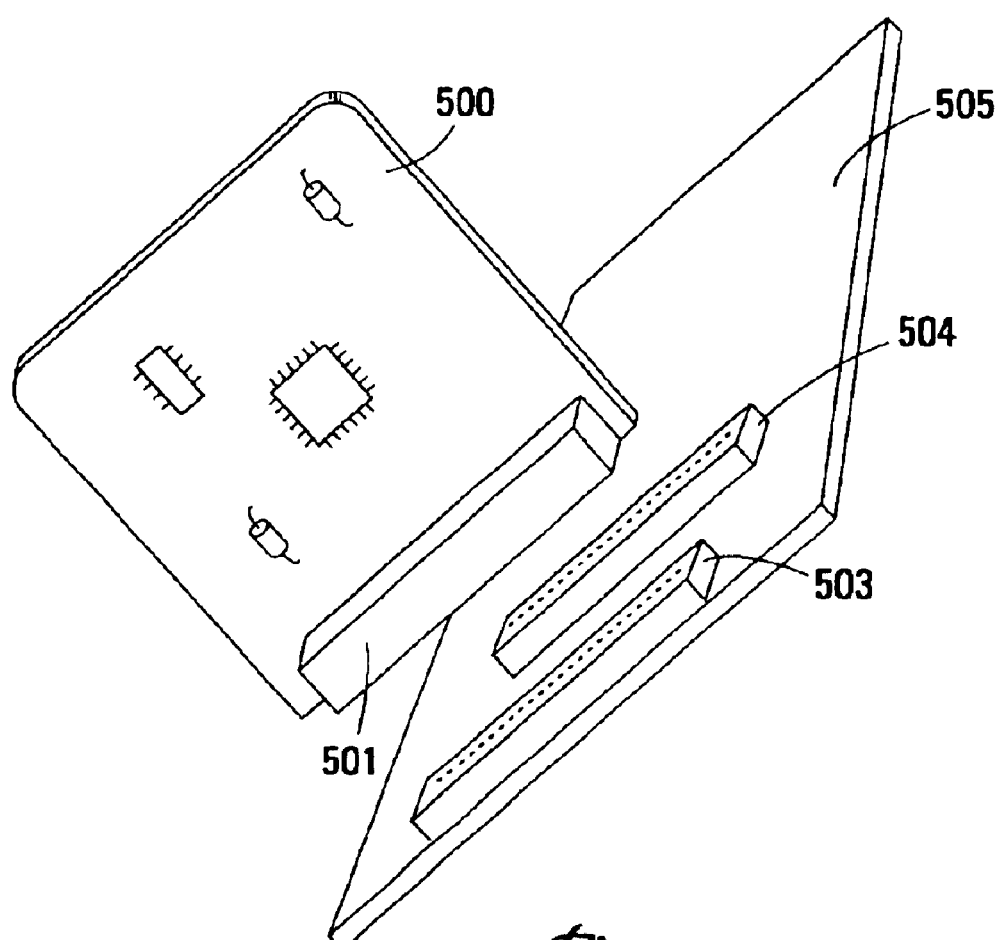
FIG. 5 shows a block diagram of an electronic system in accordance with one embodiment of the inrush limiter circuit of the present invention.

FIG. 5 illustrates an example of an electronic system that incorporate the various embodiments of the inrush limiter circuit. This system includes a circuit card (500) that has a connector (501) for conducting signals to and from the circuit card to the rest of the system. The system also includes a backplane (505) that incorporates circuitry for conducting signals from one backplane connector (503) to another (504). The backplane (505) supplies the power to the circuit card (500).

The circuit card connector (501) mates with one of the backplane connectors (503) in order for the circuit card to interact with the rest of the system. In one embodiment, the embodiments of the inrush limiter circuit of the present invention resides on the circuit card (500) in order to limit the inrush current and contact chatter that occurs when the circuit card connector (501) mates with the backplane connector (503). In another embodiment, the inrush limiter circuit resides on the backplane nearest the connector to which it is coupled.

The electronic system illustrated in FIG. 5 can be any system that has "hot swappable" requirements. The embodiments of the present invention are also not limited to any one type of connection or connector.

Numerous modifications and variations of the present invention are possible in light of the above teachings. It is therefore to be understood that within the scope of the appended claims, the invention may be practiced otherwise than as specifically described herein.

What is claimed is:

1. An inrush limiter circuit comprising:
   a first field effect transistor having a source terminal, a gate terminal, and a drain terminal, the source terminal coupled to an input power source and the drain terminal coupled to an output of the inrush limiter circuit, the first field effect transistor being in an off state prior to application of power from the input power source;

a capacitor coupled between the drain terminal and the gate terminal of the first field effect transistor, and a switching device coupled between the gate and source terminals of the first field effect transistor, the switching device capable of applying a voltage to the capacitor in order to charge the capacitor to an input power source voltage level, the switching device being in an on state prior to application of power from the input power source.

2. The inrush limiter circuit of claim 1 and further including a resistor in series with the capacitor and the drain terminal to limit charging current to the capacitor.

3. The inrush limiter circuit of claim 1 wherein the switching device is a junction field effect transistor having a drain terminal coupled to the source terminal of the first field effect transistor, a gate terminal coupled to a biasing voltage, and a source terminal coupled to the gate terminal of the first field effect transistor.

4. The inrush limiter circuit of claim 3 and further including a biasing resistor circuit coupled to the gate of the junction field effect transistor to generate the biasing voltage for the junction field effect transistor.

5. The inrush limiter circuit of claim 1 wherein the field effect transistor is a metal oxide semiconductor field effect transistor.

6. An inrush limiter circuit comprising:

a metal oxide semiconductor field effect transistor (MOSFET) having a source terminal, a gate terminal, and a drain terminal, the source terminal coupled to an input power source and the drain terminal coupled to an output of the inrush limiter circuit, the MOSFET being in an off state prior to application of power from the input power source;

a capacitor coupled between the drain terminal and the gate terminal of the field effect transistor;

a first biasing circuit that generates a first biasing voltage; and a junction field effect transistor having a drain terminal connected to the source terminal of the MOSFET, a source terminal connected to the gate terminal of the MOSFET, and a gate terminal coupled to the first biasing circuit, the junction field effect transistor applying, in response to the first biasing voltage, a charging voltage to the capacitor in order to charge the capacitor to the input power source, the junction field effect transistor being in an on state prior to application of power from the input power source.

7. The inrush limiter circuit of claim 6 and further including:

a first diode coupled between the drain and source terminals of the junction field effect transistor and a second diode coupled between the gate and source terminals of the junction field effect transistor.

8. The inrush limiter circuit of claim 6 and further including a power control circuit comprising:

a second biasing circuit that generates a second biasing voltage in response to a drain to source voltage of the metal oxide semiconductor field effect transistor;

a first transistor having a base terminal coupled to the second biasing circuit, the first transistor further having an emitter terminal coupled to the source terminal of the metal oxide semiconductor field effect transistor, and a collector terminal;

a third biasing circuit that generates a third biasing voltage in response to a collector voltage of the first transistor; and a second transistor having a base terminal, a collector terminal, and an emitter terminal, the base terminal coupled to the biasing circuit such that a power control signal is generated at the collector terminal in response to a current flowing through the first transistor.

9. An inrush limiter circuit comprising:

a first field effect transistor having a source terminal, a gate terminal, and a drain terminal, the source terminal coupled to an input power source and the drain terminal coupled to an output of the inrush limiter circuit, the first field effect transistor being in an off state prior to application of power from the input power source;

a first capacitor coupled between the drain terminal and the gate terminal of the field effect transistor;

a first switching device coupled between the gate and source terminals of the field effect transistor, the switching device capable of applying a voltage to the first capacitor in order to charge the first capacitor to the input power source, the first switching device being in an on state prior to application power from the input power source;

a time-delay circuit coupled to the first switching device that delays turn-off of the first switching device; and a second switching device coupled between the gate and the source terminals of the first field effect transistor, the second switching device having a control input that turns on the second switching device in response to an activation signal.

10. The inrush limiter circuit of claim 9 wherein the first and second switching devices are junction field effect transistors.

11. The inrush limiter circuit of claim 9 wherein the time-delay circuit is comprised of a capacitor in parallel with a resistor.

12. The inrush limiter circuit of claim 9 wherein the activation signal is coupled to the second switching device through a voltage level shifting circuit.

13. An inrush limiter circuit comprising:

a metal oxide semiconductor field effect transistor (MOSFET) having a source terminal, a gate terminal, and a drain terminal, the source terminal coupled to an input power source and the drain terminal coupled to an output of the inrush limiter circuit, the MOSFET being in an off state prior to application of power from the input power source;

a capacitor coupled between the drain terminal and the gate terminal of the field effect transistor;

a first biasing circuit that generates a first biasing voltage;

a first junction field effect transistor having a drain terminal connected to the source terminal of the MOSFET, a source terminal connected to the gate terminal of the MOSFET, and a gate terminal coupled to the first biasing circuit, the first junction field effect transistor applying, in response to the first biasing voltage, a charging voltage to the capacitor in order to charge the capacitor to the input power source, the first junction field effect transistor being in an on state prior to application of power from the input power source;

a time delay circuit coupled to the first junction field effect transistor that delays turn-off of the first junction field effect transistor; and a second junction field effect transistor having a drain terminal coupled to the source terminal of the MOSFET and a source terminal coupled to the gate terminal of the MOSFET, the second junction field effect transistor having a gate terminal acting as a control input such that the second junction field effect transistor turns on in response to an activation signal.

14. The inrush limiter circuit of claim 13 wherein the activation signal is coupled to the second junction field effect transistor through a voltage level shifting circuit.

15. The inrush limiter circuit of claim 13 and further including a power control circuit that generates a power control signal for controlling load circuit regulators, the power control circuit coupled to the MOSFET such that the power control circuit remains on until after a source to drain voltage of the MOSFET drops to a predetermined voltage.

16. An inrush limiter circuit comprising:
a metal oxide semiconductor field effect transistor (MOSFET) having a source terminal, a gate terminal, and a drain terminal, the source terminal coupled to an input power source and the drain terminal coupled to an output of the inrush limiter circuit, the MOSFET being in an off state prior to application of power from the input power source;
a capacitor coupled between the drain terminal and the gate terminal of the field effect transistor;
a first biasing circuit that generates a first biasing voltage;
a first junction field effect transistor having a drain terminal connected to the source terminal of the MOSFET, a source terminal connected to the gate terminal of the MOSFET, and a gate terminal coupled to the first biasing circuit, the first junction field effect transistor applying, in response to the first biasing voltage, a charging voltage to the capacitor in order to charge the capacitor to the input power source, the first junction field effect transistor being in an on state prior to application of power from the input power source;
a time delay circuit coupled to the first junction field effect transistor that delays turn-off of the first junction field effect transistor; and
a second junction field effect transistor having a drain terminal coupled to the gate terminal of the first junction field effect transistor and a source terminal coupled to the gate terminal of the MOSFET, the second junction field effect transistor having a gate terminal acting as a control input such that the second junction field effect transistor turns on in response to an activation signal.

17. The inrush limiter circuit of claim 16 and further including a power control circuit that generates a power control signal for controlling load circuit regulators, the power control circuit coupled to the MOSFET such that the power control circuit remains on until after a source to drain voltage of the MOSFET drops to a predetermined voltage.

18. A method for limiting inrush current to a circuit having an inrush limiter circuit, the method comprising:
coupling a source terminal of a first field effect transistor to an input power source and a drain terminal to an output of the inrush limiter circuit;
delaying a rise in a gate to drain voltage with a capacitor coupled between the drain terminal and a gate terminal of the field effect transistor; and
charging the capacitor when a switching device, coupled between the gate and source terminals of the field effect transistor, the switching device being in an on state prior to application of power from the input power source.

19. The method of claim 18 wherein the charging further includes delaying the rate of charging in response to a resistor in series with the capacitor.

20. An electronic system comprising:
a backplane having a first connector to which power is conducted; and
a circuit card that couples to the first connector, the circuit card comprising:
an inrush limiter circuit comprising:
a first field effect transistor having a source terminal, a gate terminal, and a drain terminal, the source terminal coupled to an input power source and the drain terminal coupled to an output of the inrush limiter circuit, the first field effect transistor being in an off state prior to application of power from the input power source;
a capacitor coupled between the drain terminal and the gate terminal of the field effect transistor, and
a switching device coupled between the gate and source terminals of the field effect transistor, the switching device capable of applying a voltage to the capacitor in order to charge the capacitor to the input power source, the switching device being in an on state prior to application of power from the input power source.

21. The system of claim 20 wherein the first field effect transistor is a metal oxide semiconductor field effect transistor.

22. The system of claim 20 and further including a resistor in series with the capacitor and the drain terminal to limit charging current to the capacitor.

23. The system of claim 20 wherein the switching device is a junction field effect transistor having a drain terminal coupled to the source terminal of the first field effect transistor, a gate terminal coupled to a biasing voltage, and a source terminal coupled to the gate terminal of the first field effect transistor.

24. The system of claim 23 and further including a biasing resistor circuit coupled to the gate of the junction field effect transistor to generate the biasing voltage for the junction field effect transistor.

25. An inrush limiter circuit comprising:
a first field effect transistor having a source terminal, a gate terminal, and a drain terminal, the source terminal coupled to a positive input power source and the drain terminal coupled to a positive output of the inrush limiter circuit, the first field effect transistor being in an off state prior to application of power from the input power source;
a first capacitor coupled between the drain terminal and the gate terminal of the first field effect transistor;
a first switching device coupled between the gate and source terminals of the first field effect transistor, the first switching device capable of applying a voltage to the first capacitor in order to charge the capacitor to a positive input power source voltage level, the first switching device being in an on state prior to application of power from the input power source;
a second field effect transistor having a source terminal, a gate terminal, and a drain terminal, the source terminal coupled to a negative input power source and the drain terminal coupled to a negative output of the inrush limiter circuit, the second field effect transistor being in an off state prior to application of power from the input power source;
a second capacitor coupled between the drain terminal and the gate terminal of the second field effect transistor; and a second switching device coupled between the gate and source terminals of the second field effect transistor, the second switching device capable of applying a voltage to the second capacitor in order to charge the capacitor to a negative input power source voltage level, the second switching device being in an on state prior to application of power from the input power source.

26. The inrush limiter circuit of claim 25 and further including a first and second resistor in series with the first and second capacitors, respectively, and the drain terminal of the first and second field effect transistors to limit charging current to the first and second capacitors.

27. The inrush limiter circuit of claim 25 wherein the first and second switching devices are first and second junction field effect transistors each having a drain terminal coupled to the source terminal of the first and second field effect transistors respectively, a gate terminal coupled to a biasing voltage, and a source terminal coupled to the gate terminals of the first and second field effect transistors respectively.

28. The inrush limiter circuit of claim 27 and further including a biasing resistor circuit coupled to the gates of the first and second junction field effect transistors to generate the biasing voltage for the first and second junction field effect transistors respectively.

29. The inrush limiter circuit 27 the first and second field effect transistors are a metal oxide semiconductor field effect transistors.

30. An inrush limiter circuit comprising:
a first field effect transistor having a source terminal, a gate terminal, and a drain terminal, the source terminal coupled to an input power source and the drain terminal coupled to an output of the inrush limiter circuit, the first field effect transistor being in an off state prior to application of power from the input power source;

a capacitor coupled between the drain terminal and the gate terminal of the first field effect transistor, and a switching device with a low impedance state, the switching device in the low impedance state prior to the initial application of power, the switching device coupled between the gate and source terminals oft-he first field effect transistor, the switching device adapted to hold the first field effect transistor in a high impedance state for a period of time after the initial application of power.

31. A method for limiting inrush current to a circuit having a load, the method comprising:

applying power to the circuit;

operating a field effect transistor in a high impedance state immediately after application of power to control the current flowing to the load of the circuit;

operating a switching device in a low impedance state immediately after application of power;

holding the first field effect transistor in its high impedance state with the switching device for a period of time; and transitioning the first field effect transistor into a low impedance state to ramp up a voltage at the load of the circuit without significant inrush current.

* * * * *